(12) United States Patent
Jang (10) Patent No.: US 10,371,073 B2
(45) Date of Patent: Aug. 6, 2019

(54) VEHICLE SYSTEM AND METHOD OF HEATING SOOT FILTER BY USING THE SAME

(71) Applicants: Hyundai Motor Company, Seoul (KR); Kia Motors Corporation, Seoul (KR)

(72) Inventor: Hwa Yong Jang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/826,179

(22) Filed: Nov. 29, 2017

(65) Prior Publication Data

US 2019/0120155 A1 Apr. 25, 2019

(30) Foreign Application Priority Data

Oct. 25, 2017 (KR) .................. 10-2017-0139163

(51) Int. Cl.
  *F01N 3/023* (2006.01)
  *F02D 41/02* (2006.01)
  *F01N 3/021* (2006.01)
  *F02N 11/04* (2006.01)

(52) U.S. Cl.
  CPC .......... *F02D 41/024* (2013.01); *F01N 3/021* (2013.01); *F02D 41/029* (2013.01); *F02N 11/04* (2013.01); *F02D 2041/026* (2013.01)

(58) Field of Classification Search
  CPC ... F02D 41/029; F02D 2041/026; F01N 3/023
  See application file for complete search history.

(56) References Cited

U.S. PATENT DOCUMENTS

| 2003/0066286 | A1* | 4/2003 | Murata | ................. B60K 6/485 60/284 |
| 2017/0314446 | A1* | 11/2017 | Naidu | ..................... F01N 3/023 |
| 2018/0087424 | A1* | 3/2018 | Wakamatsu | .............. F01N 3/20 |

* cited by examiner

*Primary Examiner* — Jonathan R Matthias
(74) *Attorney, Agent, or Firm* — Slater Matsil, LLP (57) ABSTRACT

A vehicle system includes: an engine including a combustion chamber in which an air-fuel mixture is burned to generate energy, an intake manifold which supplies air to the combustion chamber, an injector which supplies fuel to the combustion chamber, and an exhaust manifold which discharges exhaust gas generated by combustion of the air-fuel mixture through an exhaust pipe; a hybrid starter and generator (HSG) which generates electricity by starting the engine or by using energy generated in the engine; a soot filter which is mounted to the exhaust pipe and collects particulate matters (soot) included in exhaust gas; and a control unit which controls an operation of the injector and controls an operation of the HSG, in which when the quantity of soot is larger than a predetermined quantity, the control unit increases a size of a load of the HSG by a predetermined load quantity until a temperature of the soot filter reaches a predetermined temperature.

13 Claims, 3 Drawing Sheets

VEHICLE SYSTEM AND METHOD OF HEATING SOOT FILTER BY USING THE SAME

CROSS-REFERENCE TO RELATED APPLICATIONS

This application claims priority to Korean Patent Application No. 10-2017-0139163, filed in the Korean Intellectual Property Office on Oct. 25, 2017, which application is hereby incorporated herein by reference.

TECHNICAL FIELD

The present invention relates to a vehicle system including a soot filter, and a method of heating a soot filter, which is capable of rapidly heating a soot filter by adjusting a load of a hybrid starter and generator according to a temperature of the soot filter when a regeneration condition of the soot filter is satisfied.

BACKGROUND

A general vehicle travels by using energy which is generated by burning an air-fuel mixture in an engine. Recently, in order to respond to strengthened exhaust gas regulations and improve fuel efficiency, a hybrid vehicle is increasingly used.

The hybrid vehicle means a vehicle using two or more power sources. In general, the hybrid vehicle includes an internal combustion engine which is driven by burning fossil fuel, and a motor which is driven with electric energy stored in a battery as power sources.

As a battery of 48 V is applied to the vehicle, an interest in a mild hybrid vehicle is increased. The mild hybrid vehicle uses an engine as a main power source, and uses a motor as an assistance of the engine. That is, the motor of the mild hybrid vehicle is generally connected to the engine to start the engine, assists with torque during a driving of the engine, and charges a battery by using excess energy during the driving of the engine.

In the meantime, the exhaust gas generated during a combustion process includes various materials (for example, hydrocarbon, carbon dioxide, and nitrogen oxide), and in order to respond to an environment regulation, some of the various materials contained in the exhaust gas need to be removed.

In general, the exhaust gas discharged from the engine through an exhaust manifold is introduced to a catalytic converter that is installed in an exhaust pipe and is purified, is then passed through a muffler to decrease noise, and then is discharged to the air through a tailpipe. The catalytic converter purifies contaminant materials included in the exhaust gas. Further, a soot filter for collecting particulate matters (PM) included in the exhaust gas is mounted on the exhaust pipe.

The soot filter includes a wall made of a porous material, and when the exhaust gas passes through the wall, the PM included in the exhaust gas cannot pass through the wall and is collected in the soot filter. According to an increase in the quantity of PM (that is, soot) collected in the soot filter, an area of the wall, through which the exhaust gas may pass, is decreased. Accordingly, back pressure is increased and a performance of the engine is deteriorated. Accordingly, the soot collected in the soot filter needs to be removed at an appropriate time, and this process is referred to as regeneration of the soot filter.

The regeneration of the soot filter is performed by increasing a temperature of the exhaust gas and burning the soot collected in the soot filter, and in order to burn the soot, a temperature of the exhaust gas needs to be at least 650° C.

According to a method of regenerating a soot filter in the related art, when the quantity of soot collected in the soot filter is equal to or larger than a predetermined quantity, a temperature of exhaust gas is increased by post-injecting fuel. That is, a temperature of the exhaust gas is not directly increased through combustion, but a temperature of the exhaust gas is indirectly increased by making post-injected fuel flow into an exhaust pipe to facilitate an oxidation-reduction reaction between the exhaust gas and unburned fuel. Further, the unburned fuel also facilitates oxidation of soot in a soot filter. When a temperature of the exhaust gas is indirectly increased, heating of the soot filter requires a lot of time. Further, the regeneration of the soot filter is frequently stopped by a change in an operation condition during the heating of the soot filter. Accordingly, there is a need for a technology for decreasing a heating time of the soot filter.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a method of heating a soot filter which increases a load of a hybrid starter and generator according to a temperature of a soot filter during regeneration of the soot filter, thereby decreasing a heating time of a soot filter and directly increasing a temperature of exhaust gas, and a vehicle system using the same. An exemplary embodiment of the present invention provides a vehicle system including: an engine including a combustion chamber in which an air-fuel mixture is burned to generate energy, an intake manifold which supplies air to the combustion chamber, an injector which supplies fuel to the combustion chamber, and an exhaust manifold which discharges exhaust gas generated by combustion of the air-fuel mixture through an exhaust pipe; a hybrid starter and generator (HSG) which generates electricity by starting the engine or by using energy generated in the engine; a soot filter which is mounted to the exhaust pipe and collects particulate matters (soot) included in exhaust gas; and a control unit which controls an operation of the injector and controls an operation of the HSG, in which when the quantity of soot is larger than a predetermined quantity, the control unit increases a size of a load of the HSG by a predetermined load quantity until a temperature of the soot filter reaches a predetermined temperature.

The predetermined load quantity may be changed according to a difference between the temperature of the soot filter and the predetermined temperature.

The predetermined load quantity may be large as the difference between the temperature of the soot filter and the predetermined temperature is large.

The difference between the temperature of the soot filter and the predetermined temperature may be divided into two or more temperature difference sections, and the predetermined load quantity may be uniform in any one temperature difference section.

When the temperature of the soot filter reaches the predetermined temperature, the control unit may perform regeneration of the soot filter.

When a coasting condition is satisfied during the regeneration of the soot filter, the control unit may stop the regeneration of the soot filter.

Another exemplary embodiment of the present invention provides a method of heating a soot filter by using the vehicle system.

The method may include: when the engine is operated, determining whether the quantity of soot collected in the soot filter is equal to or larger than a predetermined quantity; when the quantity of soot collected in the soot filter is equal to or larger than the predetermined quantity, determining whether a temperature of the soot filter is lower than a first temperature; and when the temperature of the soot filter is lower than the first temperature, increasing a load of the HSG by a first load.

The method may further include, when the temperature of the soot filter is equal to or higher than the first temperature, determining whether the temperature of the soot filter is lower than a second temperature; when the temperature of the soot filter is lower than the second temperature, increasing a load of the HSG by a second load which is smaller than the first load; and returning to the determining of whether the temperature of the soot filter is lower than the first temperature.

The method may further include, when the temperature of the soot filter is equal to or higher than the second temperature, determining whether the temperature of the soot filter is higher than a third temperature, when the temperature of the soot filter is equal to or lower than the third temperature, increasing a load of the HSG by a third load which is smaller than the second load; and returning to the determining of whether the temperature of the soot filter is lower than the first temperature.

The method may further include, when the temperature of the soot filter is higher than the third temperature, regenerating the soot filter.

The method may further include, when the coasting condition is satisfied during the regeneration of the soot filter, stopping the regeneration of the soot filter.

According to exemplary embodiments of the present invention, a load of the hybrid starter and generator is increased according to a temperature of the soot filter during the regeneration of the soot filter, thereby decreasing a heating time of the soot filter.

Further, a temperature of exhaust gas is directly increased, thereby decreasing the quantity of fuel required for increasing a temperature of the exhaust gas and improving fuel efficiency.

Further, when a coasting condition is satisfied during the regeneration of the soot filter, the soot filter is regenerated through natural regeneration, thereby further improving fuel efficiency.

The method may further include injecting post-injection fuel into the exhaust gas when the temperature of the soot filter is higher than the third temperature.

Another exemplary embodiment of the present invention provides a system comprising: an internal combustion engine; an exhaust gas path connected to an output of the internal combustion engine, the exhaust gas path including a soot filter; a load generator coupled to the internal combustion engine; and a control unit coupled to the internal combustion engine and the load generator, wherein the control unit is configured to determine when a first operating condition of the soot filter is met and in response thereto to cause the load generator to increase a load on the internal combustion engine by a first amount when a temperature of exhaust gas in the exhaust gas is less than a first predetermined temperature, further configured to cause the load generator to increase a load on the internal combustion engine by a second amount less than the first amount when the temperature of exhaust gas in the exhaust gas path is greater than or equal to the first predetermined temperature and less than a second predetermined temperature, and further configured to operate a regeneration process on the soot filter when the temperature of exhaust gas in the exhaust gas path is above third predetermined temperature, the third predetermined temperature being greater than the second predetermined temperature.

The control unit may be further configured to cause the load generator to increase a load on the internal combustion engine by a third amount less than the second amount when the temperature of exhaust gas in the exhaust gas path is greater than or equal to the second predetermined temperature and less than or equal to the third predetermined temperature.

In some embodiments, the load generator is connected to a crankshaft of the internal combustion engine. In other embodiments, the first operating condition of the soot filter is met when a quantity of soot within the soot filter exceeds a predetermined quantity.

The system may further include a pressure differential sensor that generates a signal corresponding to the quantity of soot in the soot filer. In some embodiments, the system is a self-propelled vehicle. In some embodiments, the load generator is a hybrid starter and generator.

In at least one aspect, the control unit is further configured to increase injection of fuel into a combustion chamber of the internal combustion engine in response to the generation of an increased load on the internal combustion engine.

Other effects obtainable or expected through exemplary embodiments of the present invention are directly or implicitly disclosed in the detailed description of the exemplary embodiments of the present invention. That is, various expected effects according to exemplary embodiment of the present invention will be disclosed in the detailed description to be given below.

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Terms used in the present specification are for the purpose of simply describing specific exemplary embodiments, and do not intend to limit the present invention. As used herein, the singular forms are intended to include the plural forms as well, unless the context clearly indicates otherwise. The terms, such as "include" and/or "including", used in the present specification may be construed to specify the existence of the mentioned characteristics, numbers, steps, operations, constituent element, and/or components, but may not be construed to exclude one or more other characteristics, numbers, steps, operations, constituent elements, components, and/or combinations thereof. As used in the present specification, a term "and/or" includes some a predetermined combination and all of the combinations of one or more related and listed items. The term "coupled" indicates a physical relation between two components, and herein, the components are directly connected with each other or are indirectly connected through one or more intermediate components.

As used in the present specification, terms "vehicle" and "vehicular" or other similar terms include vehicles, in general, passenger automobiles including sports utility vehicles (SUV), buses, trucks, various commercial vehicles, vessels including various boats and ships, airplanes, and the like, and are construed to include hybrid vehicles, electric vehicles, hybrid electric vehicles, hydrogen power vehicles, and other alternative fuel (for example, fuel induced from sources, not oil) vehicles. As mentioned in the present specification, an electric vehicle (EV) is a vehicle including electric power obtained from a chargeable energy storage device (for example, one or more rechargeable electrochemical cell or other types of battery) as a part of locomotion capabilities. The EV is not limited to a vehicle, and may include motor cycles, carts, scooters, and the like. Further, the hybrid vehicle is a vehicle including two or more power sources, for example, gasoline-based power and electricity-based power (for example, a hybrid electric vehicle (HEV)).

In addition, one or more methods below or aspects thereof may be executed by one or more control units, a controller area network (CAN) bus, or a vehicle network. The control unit, the CAN bus, or the vehicle network may be implemented in a vehicle described in the present specification. The term "control unit" may refer to a hardware device including a memory and a processor. The memory is configured to store program commands, and the processor is specially programmed so as to execute program commands performing one or more processes which are further described below. Further, the methods below may be linked with one or more additional components and executed by a system including the control unit as described in detail below.

Further, the method of the present specification may be implemented as a storage medium which is non-transitorily computer readable on computer readable storage media including executable program commands executed by a processor, a control unit, and the like. Examples of the computer readable storage media include a read only memory (ROM), a random access memory (RAM), compact disk (CD) ROMs, magnetic tapes, floppy disks, flash drivers, smart cards, and optical data storage devices, but the computer readable storage media are not limited thereto. For example, the computer readable storage media may also be distributed through a network combined to computer systems so as to be stored and executed in a form distributed by a telematics server or a CAN.

Figure 1:
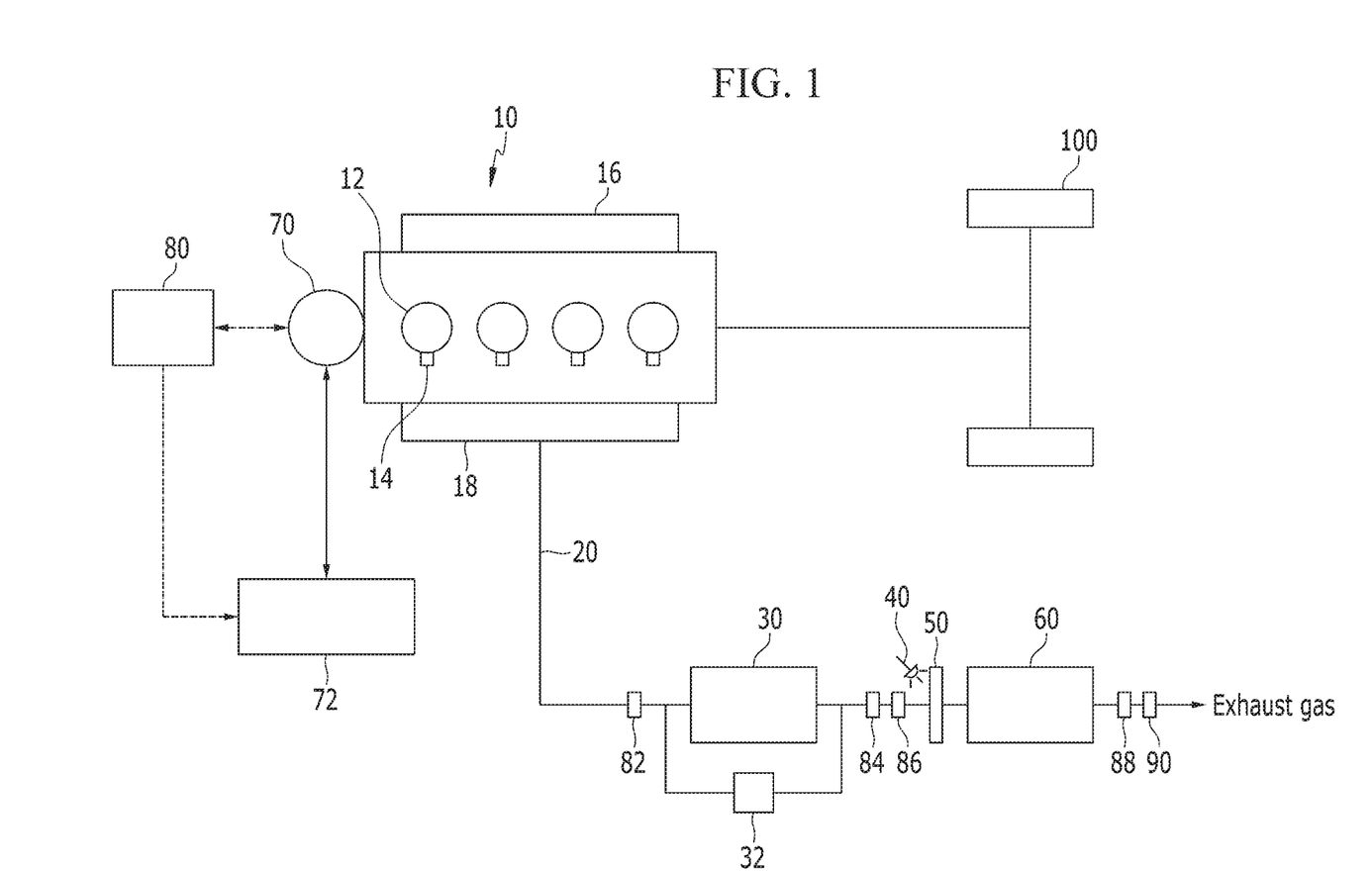
FIG. 1 is a schematic diagram of a vehicle system according to an exemplary embodiment of the present invention.

FIG. 1 is a schematic diagram of a vehicle system according to an exemplary embodiment of the present invention.

As illustrated in FIG. 1, the vehicle system according to an exemplary embodiment of the present invention includes an engine 10, an exhaust pipe 20, a soot filter 30, an injection module 40, a selective catalytic reduction (SCR) catalyst 60, a hybrid starter and generator (HSG) 70, a battery 72, and a control unit 80.

Herein, a mild hybrid starter and generator (MHSG) is exemplified as the HSG. However, the HSG is not limited to the MHSG, and as long as an HSG performs a function of the HSG according to the exemplary embodiment of FIG. 1, the HSG is sufficient.

The engine 10 burns an air-fuel mixture and converts chemical energy to mechanical energy. The engine 10 is connected with an intake manifold 16 that introduces air into a combustion chamber 12, and exhaust gas generated during a combustion process is collected in an exhaust manifold 18 and then is discharged outside the engine 10. An injector 14 is mounted in the combustion chamber 12 to inject fuel into the combustion chamber 12.

Herein, a diesel engine is exemplified, but a lean burn gasoline engine may also be used. When the gasoline engine is used, an air-fuel mixture is introduced into the combustion chamber 12 through the intake manifold 16, and an ignition plug (not illustrated) for ignition is mounted to an upper portion of the combustion chamber 12. Further, when a gasoline direct injection (GDI) engine is used, the injector 14 is mounted to an upper portion of the combustion chamber 12 similar to the diesel engine.

Mechanical energy generated in the engine 10 is transferred to wheels 100 of the vehicle through a transmission (not illustrated), so that the vehicle travels.

The exhaust pipe 20 is connected to the exhaust manifold 18 and discharges exhaust gas to an outside of the vehicle. The soot filter 30, the injection module 40, and the SCR catalyst 60 are mounted on the exhaust pipe 20 and removes hydrocarbon, carbon monoxide, particulate matters, nitrogen oxide, and the like contained in exhaust gas.

The soot filter 30 is mounted to the exhaust pipe 20 at a rear end of the engine 10, and collects particulate matters contained in exhaust gas. In general, the soot filter 30 includes a plurality of inlet channels and a plurality of outlet channels. One end of the inlet channel is opened and the other end of the inlet channel is closed, so that the inlet channel receives exhaust gas from a front end of the soot filter 30. Further, one end of the outlet channel is closed and the other end of the outlet channel is opened, so that the outlet channel discharges exhaust gas from the soot filter 30. The exhaust gas introduced into the soot filter 30 through the inlet channel enters the outlet channel through a porous wall which divides the inlet channel and the outlet channel, and then is discharged from the soot filter 30 through the outlet channel. Particulate matter (that is, soot) included in the exhaust gas is collected while the exhaust gas passes through the porous wall.

In the meantime, a differential pressure sensor 32 is mounted to the exhaust pipe 20. The differential pressure sensor 32 measures a difference in a pressure between the front end portion and the rear end portion of the soot filter 30, and transmits a signal corresponding to the difference to the control unit 80. The control unit 80 may control the soot filter 30 to be regenerated when the difference between the pressures measured by the differential pressure sensor 32 is equal to or larger than a predetermined pressure. In this case, the injector 14 post-injects fuel, thereby burning the particulate matters collected inside the soot filter 30. Further, when a temperature of exhaust gas passing through the soot filter 30 is low, the control unit 80 may increase a load of the MHSG 70 and heat the exhaust gas.

A first temperature sensor 82 is mounted to the exhaust pipe 20 at the front side of the soot filter 30 to detect a temperature of the exhaust gas introduced into the soot filter 30. Further, a second temperature sensor 84 is mounted to the exhaust pipe 20 at the rear side of the soot filter 30 to detect a temperature of the exhaust gas discharged from the soot filter 30.

Herein, the case where the first and second temperature sensors 82 and 84 are disposed at the front side and the rear side of the soot filter 30 is exemplified. However, the exemplary embodiment of the present invention is not limited to the use of both first and second temperature sensors 82 and 84, and any one of the first and second temperature sensors 82 and 84 may be used only. Further, herein, the temperature of the soot filter 30 may mean a temperature of the exhaust gas passing through the soot filter 30, and may be determined based on a measurement value of the first temperature sensor 82, a measurement value of the second temperature sensor 84, or any one of the measurement values of the first and second temperature sensors 82 and 84.

The injection module 40 is mounted to the exhaust pipe 20 at the rear end of the soot filter 30, and is controlled by the control unit 80 and injects a reducing agent to the exhaust gas. In general, the injection module 40 injects urea, and the injected urea is converted to ammonia by hydrolysis. However, the reducing agent is not limited to ammonia.

A mixer 50 is mounted to the exhaust pipe 20 at the rear end of the injection module 40, thereby evenly mixing the reducing agent in the exhaust gas.

The SCR catalyst 60 is mounted to the exhaust pipe 20 at the rear end of the mixer 50, and reduces nitrogen oxide included in the exhaust gas by using the reducing agent injected from the injection module 40.

A first NOx sensor 86 is mounted to the exhaust pipe 20 at the front side of the SCR catalyst 60. The first NOx sensor 86 measures the quantity of nitrogen oxide contained in the exhaust gas introduced into the SCR catalyst 60 and transmits a signal corresponding to the measured quantity to the control unit 80. The quantity of NOx measured by the first NOx sensor 86 may be used for determining the quantity of reducing agents which is to be injected by the injection module 40.

Further, a third temperature sensor 88 and a second NOx sensor 90 are mounted to the exhaust pipe 20 at the rear end of the SCR catalyst 60.

The third temperature sensor 88 detects a temperature of the exhaust gas discharged from the SCR catalyst 60. Herein, the case where the second and third temperature sensors 84 and 88 are disposed at the front side and the rear side of the SCR catalyst 60 is exemplified. However, the exemplary embodiment of the present invention is not limited to the use of both second and third temperature sensors 84 and 88, and any one of the second and third temperature sensors 84 and 88 may be used only. Further, herein, the temperature of the SCR catalyst 60 may mean a temperature of the exhaust gas passing through the SCR catalyst 60, and may be determined based on a measurement value of the second temperature sensor 84, a measurement value of the third temperature sensor 88, or any one of the measurement values of the second and third temperature sensors 84 and 88.

The second NOx sensor 90 measures the quantity of nitrogen oxide included in the exhaust gas discharged from the SCR catalyst 60 and transmits a signal corresponding to the measured quantity to the control unit 80. The control unit 80 may monitor whether the SCR catalyst 60 normally removes the nitrogen oxide contained in the exhaust gas based on the detection value of the second NOx sensor 90. That is, the second NOx sensor 90 may be used for evaluating performance of the SCR catalyst 60.

The MHSG 70 may be mounted at one side of the engine 10, and may be selectively or continuously connected to a crankshaft (not illustrated) of the engine 10. The MHSG 70 may start the engine 10 by rotating the crankshaft by using electric energy of the battery 72, and assist with torque during the operation of the engine 10. Further, the MHSG 70 may generate electricity by using the energy generated in the engine 10 and charge the battery 72 with the generated electricity.

The battery 72 supplies electricity to an electronic component of the vehicle. Particularly, the battery 72 may start the engine 10 or assist with torque of the engine 10 by supplying electric energy to the MHSG 70. Further, the battery 72 may be charged by electric energy generated in the MHSG 70. The battery 72 may include a battery of 48 V, but is not limited thereto.

The control unit 80 determines an operation condition of the engine 10 based on the signals detected by the sensors, respectively, and controls the operations of the engine 10 and the MHSG 70 based on the operation condition of the engine 10. Further, the control unit 80 calculates the quantity of soot collected in the soot filter 30, and controls the regeneration of the soot filter 30 when the quantity of soot is equal to or larger than a predetermined quantity. Further, when a temperature of the soot filter 30 is low at the start of the regeneration of the soot filter 30, the control unit 80 controls the MHSG 70 and heats the soot filter 30.

In the meantime, the control unit 80 stores a plurality of maps and a plurality of models defining characteristics of the SCR catalyst 60, may calculate the quantity of ammonia adsorbed in the SCR catalyst 60 based on the plurality of maps and the plurality of models, and may adjust the quantity of reducing agents injected according to the quantity of ammonia adsorbed in the SCR catalyst 60. The plurality of maps and the plurality of models may be determined through routine experimentation.

The control unit 80 may be implemented with one or more processors operated by a predetermined program, and the predetermined program may be programmed so as to perform each operation of a method of heating a soot filter according to an exemplary embodiment of the present invention.

Figure 2:
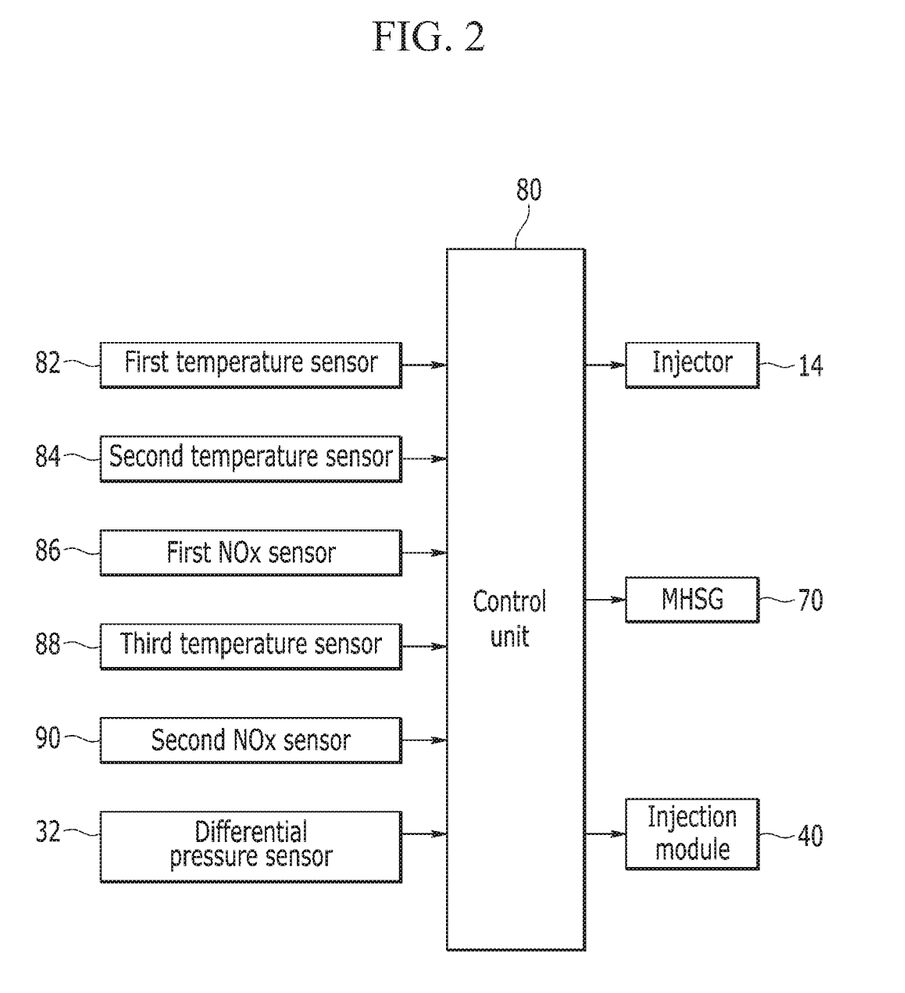
FIG. 2 is a block diagram illustrating a relation between an input and an output of a control unit used in a method of heating a soot filter according to an exemplary embodiment of the present invention.

FIG. 2 is a block diagram illustrating a relation between an input and an output of a control unit used in a method of heating a soot filter according to an exemplary embodiment of the present invention.

As illustrated in FIG. 2, the first temperature sensor 82, the second temperature sensor 84, the first NOx sensor 86, the third temperature sensor 88, the second NOx sensor 90, and the differential pressure sensor 32 are electrically connected to the control unit 80, and transmit the detected values to the control unit 80.

The first temperature sensor 82 detects a temperature of exhaust gas introduced into the soot filter 30 and transmits a signal for the detected temperature to the control unit 80.

The second temperature sensor 84 measures a temperature of exhaust gas discharged from the soot filter 30 and transmits a signal for the measured temperature to the control unit 80.

The first NOx sensor 86 measures the quantity of NOx included in the exhaust gas introduced to the SCR catalyst 60 and transmits a signal for the measured quantity to the control unit 80.

The third temperature sensor 88 measures a temperature of exhaust gas discharged from the SCR catalyst 60 and transmits a signal for the measured temperature to the control unit 80.

The second NOx sensor 90 detects the quantity of nitrogen oxide included in exhaust gas discharged from the SCR catalyst 60 and transmits a signal for the detected quantity to the control unit 80.

The differential pressure sensor 32 measures a difference in a pressure between the front end portion and the rear end portion of the soot filter 30, and transmits a signal for the measured difference to the control unit 80.

The control unit 80 determines an engine operation condition, the quantity of fuel injected, a fuel injection timing, a fuel injection pattern, the quantity of reducing agent injected, a regeneration timing of the soot filter 30, and the quantity of charging of the MHSG 70 based on the received values, and outputs signals for controlling the injector 14, the injection module 40, and the MHSG 70 to the injector 14, the injection module 40, and the MHSG 70. Further, the control unit 80 may calculate the quantity of ammonia adsorbed in the SCR catalyst 60 based on the received values, and calculate the quantity of reducing agents to be injected by the injection module 40 based on the calculated quantity of ammonia.

In the meantime, in the vehicle system according to an exemplary embodiment of the present invention, other sensors, in addition to the sensors illustrated in FIG. 2 may be provided, but are omitted for convenience as they are not necessary for understanding embodiments of the present invention.

Further, the positions of the sensors may be changed as necessary, and are not limited to the positions illustrated in FIG. 1.

Figure 3:
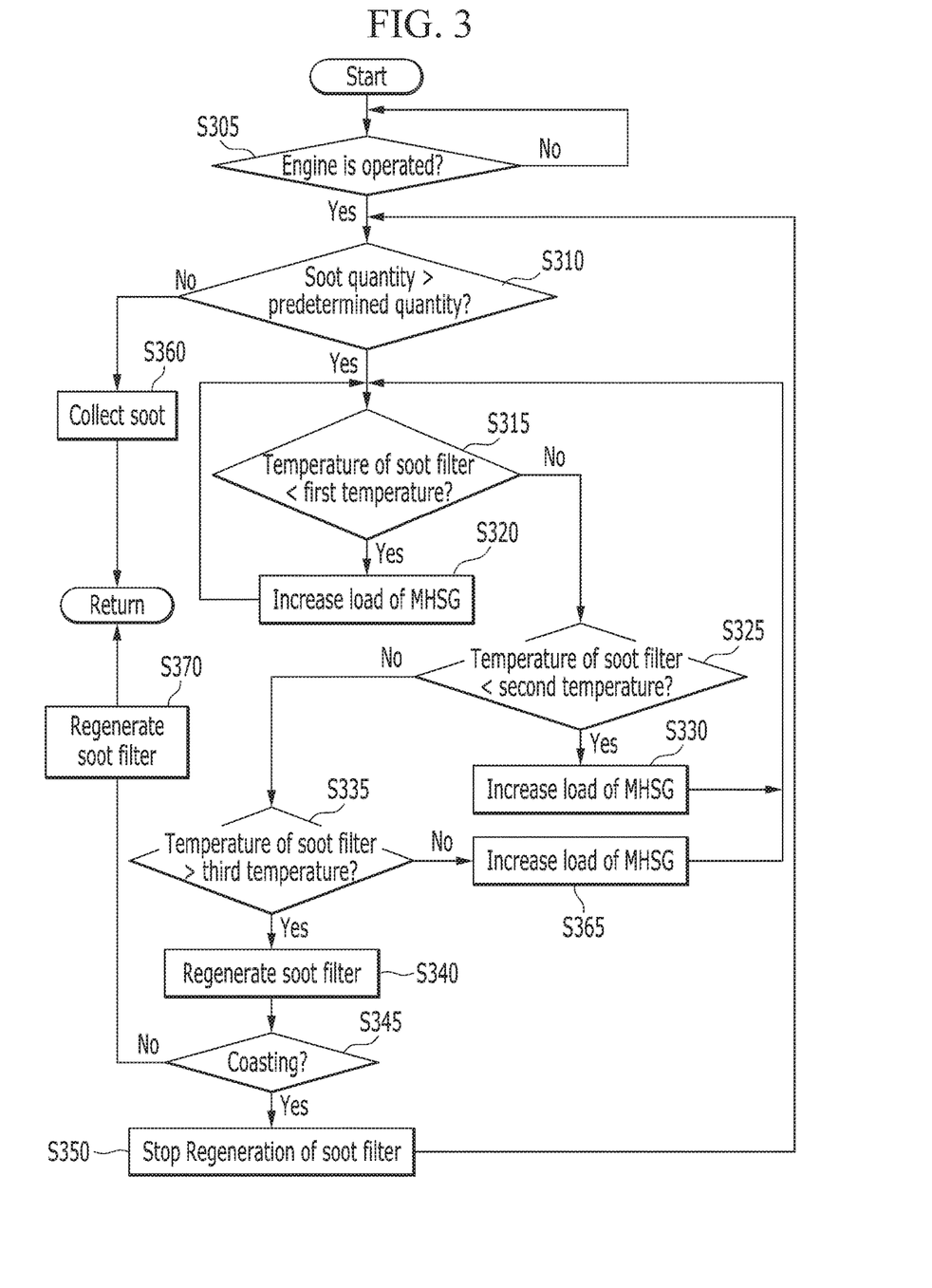
FIG. 3 is a flowchart illustrating the method of heating the soot filter according to an exemplary embodiment of the present invention.

FIG. 3 is a flowchart illustrating the method of heating the soot filter according to an exemplary embodiment of the present invention.

As illustrated in FIG. 3, the method of heating the soot filter according to an exemplary embodiment of the present invention starts with confirming whether the engine 10 is operated at step S305. The regeneration of the soot filter 30 may be performed only when the engine 10 is operated, so that when the engine 10 is not operated, the method continuously determines whether the engine 10 is operated.

When it is determined that the engine 10 is operated at the step S305, the control unit 80 determines whether the quantity of soot collected in the soot filter 30 is larger than a predetermined quantity at step S310. That is, the control unit 80 determines whether a differential pressure measured by the differential pressure sensor 32 is higher than a predetermined pressure.

When the quantity of soot collected in the soot filter 30 is equal to or smaller than the predetermined quantity in the step S310, the engine 10 is operated in a normal mode (that is, a mode that is not a regeneration mode of the soot filter 30), and the soot filter 30 continuously collects particulate matters contained in exhaust gas at step S360.

When the quantity of soot collected in the soot filter 30 is larger than the predetermined quantity at the step S310, the control unit 80 operates the engine 10 in the regeneration mode. The regeneration of the soot filter 30 may be performed only when a temperature of the soot filter 30 is equal to or higher than a predetermined temperature, so that the control unit 80 checks a temperature of the soot filter 30. In an exemplary embodiment of the present invention, a difference between the temperature of the soot filter 30 and the predetermined temperature is divided into four temperature difference sections, and the control unit 80 controls the engine 10 and the MHSG 70 according to a specific control strategy for each temperature difference section. However, the number of temperature difference sections is not limited to four. Further, the control unit 80 may continuously control the engine 10 and the MHSG 70 according to the difference between the temperature of the soot filter 30 and the predetermined temperature.

As illustrated in FIG. 3, the control unit 80 determines whether the temperature of the soot filter 30 is included in a first temperature difference section. That is, the control unit 80 determines whether the temperature of the soot filter 30 is lower than a first temperature at step S315. When the temperature of the soot filter 30 is lower than the first temperature at the step S315, the control unit 80 increases a load of the MHSG 70 by a first load at step S320. In general, the control unit 80 controls the injector 14 so as to inject fuel according to a predetermined map in order to satisfy a torque demanded by a driver. However, when the load of the MHSG 70 is increased, the load of the MHSG 70 serves as frictional force, so that in order to satisfy the torque demanded by the driver, the control unit 80 controls the injector 14 to inject more fuel. Accordingly, the temperature of the exhaust gas is sharply increased. In the meantime, the method of increasing the load of the MHSG 70 includes operating a clutch (not illustrated) which selectively connects a crankshaft of the engine 10 and a shaft of the MHSG 70 and/or directing a negative torque command to the MHSG 70. The method of increasing the load of the MHSG 70 is not limited to the exemplified methods, and an appropriate method among various methods known in the art may be used.

After the step S320 is performed, the control unit 80 returns to the step S315.

When the temperature of the soot filter 30 is equal to or higher than the first temperature at the step S315, the control unit 80 determines whether the temperature of the soot filter 30 is included in a second temperature difference section. That is, the control unit 80 determines whether the temperature of the soot filter 30 is lower than a second temperature at step S325. When the temperature of the soot filter 30 is lower than the second temperature at the step, the control unit 80 increases a load of the MHSG 70 by a second load at step S330. The second load is a value smaller than that of the first load. Then, the control unit 80 returns to the step S315.

When the temperature of the soot filter 30 is equal to or higher than the second temperature at the step S325, the control unit 80 determines a section between a third temperature difference section and a fourth temperature difference section in which the temperature of the soot filter 30 is included. That is, the control unit 80 determines whether the temperature of the soot filter 30 is higher than a third temperature at step S335. When the temperature of the soot filter 30 is equal to or lower than the third temperature at the step S335, the control unit 80 increases a load of the MHSG 70 by a third load at step S365. The third load is a value smaller than that of the second load. Then, the control unit 80 returns to the step S315.

When the temperature of the soot filter 30 is higher than the third temperature at the step S335, the control unit 80 performs the regeneration of the soot filter 30 at step S340. That is, the control unit 80 further increases the temperature of the exhaust gas through post-injection by the injector 14 and burns the soot collected in the soot filter 30. In this case, the control unit 80 may maintain the load of the MHSG 70 with a third load or may change the load of the MHSG 70 to an initial value (for example, 0).

During the progress of the regeneration of the soot filter 30 at the step S340, the control unit 80 determines whether a coasting condition is satisfied at step S345. The coasting condition means an operation condition in which a vehicle is operable with inertia force, and is well known in the art, so that a detailed description thereof will be omitted.

When the coasting condition is satisfied at the step S345, the control unit 80 stops the regeneration of the soot filter 30 at step S350. In this case, the control for increasing the temperature of the exhaust gas is stopped, but the temperature of the exhaust gas is sufficiently high, so that the soot filter 30 may be naturally regenerated. Accordingly, the soot filter 30 may be partially regenerated without fuel consumption. Then, the control unit 80 returns to the step S310 and determines whether the regeneration condition of the soot filter 30 is satisfied again.

When the coasting condition is not satisfied at the step S345, the control unit 80 continuously performs the regeneration of the soot filter 30 at step S370. When the regeneration of the soot filter 30 is completed, the control unit 80 terminates the method according to the present exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. As but one example, while inventive aspects have been described in the context of a vehicle, one skilled in the art will recognize that the inventive aspects described herein are applicable to, e.g., internal combustion engines employed in stationary applications such a power generation, pumping, and the like.

What is claimed is:

1. A method of heating a soot filter by using a vehicle system which includes an engine which burns an air-fuel mixture to generate energy and discharges exhaust gas generated during combustion of the air-fuel mixture, a hybrid starter and generator (HSG) which generates electricity by starting the engine or by using energy generated in the engine, the soot filter which collects particulate matters (soot) included in exhaust gas, and a control unit which control the operations of the engine and the HSG, the method comprising:
    when the engine is operated, determining whether the quantity of soot collected in the soot filter is equal to or larger than a predetermined quantity;
    when a quantity of soot collected in the soot filter is equal to or larger than the predetermined quantity, determining whether a temperature of the soot filter is lower than a first temperature;
    when the temperature of the soot filter is lower than the first temperature, increasing a load of the HSG by a first load;
    when the temperature of the soot filter is equal to or higher than the first temperature, determining whether the temperature of the soot filter is lower than a second temperature;
    when the temperature of the soot filter is lower than the second temperature, increasing a load of the HSG by a second load which is smaller than the first load; and
    returning to the determining of whether the temperature of the soot filter is lower than the first temperature.

2. The method of claim 1, further comprising:
    when the temperature of the soot filter is equal to or higher than the second temperature, determining whether the temperature of the soot filter is higher than a third temperature;
    when the temperature of the soot filter is equal to or lower than the third temperature, increasing a load of the HSG by a third load which is smaller than the second load; and
    returning to the determining of whether the temperature of the soot filter is lower than the first temperature.

3. The method of claim 2, further comprising:
    when the temperature of the soot filter is higher than the third temperature, regenerating the soot filter.

4. The method of claim 3, further comprising:
    when a coasting condition is satisfied during the regeneration of the soot filter, stopping the regeneration of the soot filter.

5. The method of claim 3, further comprising injecting post-injection fuel into the exhaust gas when the temperature of the soot filter is higher than the third temperature.

6. A system comprising:
    an internal combustion engine;
    an exhaust gas path connected to an output of the internal combustion engine, the exhaust gas path including a soot filter;
    a load generator coupled to the internal combustion engine;
    a control unit coupled to the internal combustion engine and the load generator, wherein the control unit is configured to
        determine when a first operating condition of the soot filter is met and in response thereto to
        cause the load generator to increase a load on the internal combustion engine by a first amount when a temperature of exhaust gas in the exhaust gas is less than a first predetermined temperature;
        cause the load generator to increase a load on the internal combustion engine by a second amount less than the first amount when the temperature of exhaust gas in the exhaust gas path is greater than or equal to the first predetermined temperature and less than a second predetermined temperature; and
        operate a regeneration process on the soot filter when the temperature of exhaust gas in the exhaust gas path is above third predetermined temperature, the third predetermined temperature being greater than the second predetermined temperature.

7. The system of claim 6, wherein the control unit is further configured to cause the load generator to increase a load on the internal combustion engine by a third amount less than the second amount when the temperature of exhaust gas in the exhaust gas path is greater than or equal to the second predetermined temperature and less than or equal to the third predetermined temperature.

8. The system of claim 6, wherein the load generator is connected to a crankshaft of the internal combustion engine.

9. The system of claim 6, wherein the first operating condition of the soot filter is met when a quantity of soot within the soot filter exceeds a predetermined quantity.

10. The system of claim 9, further including a pressure differential sensor that generates a signal corresponding to the quantity of soot in the soot filter.

11. The system of claim 6, wherein the system is a self-propelled vehicle.

12. The system of claim 6, wherein the load generator is a hybrid starter and generator.

13. The system of claim 6, wherein the control unit is further configured to increase injection of fuel into a combustion chamber of the internal combustion engine in response to the generation of an increased load on the internal combustion engine.

\* \* \* \* \*